United States Patent [19]

Keys

[11] Patent Number: 4,733,899
[45] Date of Patent: Mar. 29, 1988

[54] PICKUP TRUCK-BED DIVIDER DEVICE

[76] Inventor: Orbrie L. Keys, 2175 Decoto Rd. #65, Union City, Calif. 94587

[21] Appl. No.: 20,389

[22] Filed: Mar. 2, 1987

[51] Int. Cl.$^4$ .............................................. B60P 3/34
[52] U.S. Cl. ............................... 296/24 R; 296/37.6; 160/351
[58] Field of Search ................. 296/24 R, 37.6; 224/42–42 R; 410/129, 140; 220/22, 22.1; 160/351

[56] References Cited

U.S. PATENT DOCUMENTS

| | | | |
|---|---|---|---|
| 1,598,467 | 8/1926 | Weeks | 211/43 |
| 1,764,615 | 6/1930 | Edwards | 296/50 |
| 2,499,859 | 3/1950 | Halter | 160/351 |
| 2,697,631 | 12/1954 | Miller | 296/37.6 |
| 4,507,033 | 3/1985 | Boyd | 296/37.6 |

Primary Examiner—Robert R. Song
Attorney, Agent, or Firm—John J. Leavitt

[57] ABSTRACT

Presented is a portable divider device for dividing the bed of a pickup truck into smaller compartments so that material, such as groceries, deposited in the smaller compartments do not spill all over the bed. The divider device is particularly applicable on trucks on which there is a camper shell of the type that encloses the entire truck bed, leaving only an access door at the rear of the truck which may be opened to place material to be carried in the back of the pickup bed near the tail-gate. The problem is that unless the grocery bags or other materials, are supported in some way, the first time the brakes are applied, the grocery bags fall forward and all of the groceries are scattered all over the truck bed. My divider provides a flat support plate that extends across the bed of the truck and abuts against the wheel well which projects into the bed of the truck. Mounted on the support plate is a vertical baffle that also extends across the truck bed from side-to-side, thus defining a small space just inside the tail-gate within which articles to be carried may be deposited between the tailgate and the baffle, so that when the brakes are applied, the baffle prevents the articles from falling forward.

4 Claims, 4 Drawing Figures

PICKUP TRUCK-BED DIVIDER DEVICE

BACKGROUND OF THE INVENTION

1. Field of the Invention

This invention relates to dividers for pickup truck beds, and particularly to a divider device that is portable, and which may be applied or removed easily and quickly without use of tools of any kind.

2. Description of the Prior Art

A preliminary patentability search conducted in connection with this invention has revealed the existence of the following U.S. patents:

U.S. Pat. Nos. 1,764,615; 2,697,631; 4,451,075; 4,506,870.

U.S. Pat. No. 1,764,615 relates to a truck body partitioning device that is attached to a bracket mounted on the side wall of the truck box. The manner of interconnection results in a permanent structure, but permits the partition to be tilted upwardly by releasing pins from holes formed in the wall of the box. The manner of interconnection is thus not only permanent, it requires the use of tools to either install or remove, and it requires a modification of the truck bed or box, which in some instances is a disadvantage.

U.S. Pat. No. 2,697,631 also relates to a partitioning device for a truck box, and comprises two channel members mounted on opposite walls of the truck bed, with an extension that passes over the top edge of the box to hold the channels in position. Once the channels are in position, boards may be dropped into the channels to form the vertical upright member or partition required to form smaller compartments of the truck bed. Again, tools must be used to implement this device, and modifications must be made to the truck bed. Once installed, the installation is a permanent one, and it is not easily removed.

U.S. Pat. No. 4,451,075 provides a sloping wall attached pivotally to the wheel well by pins so that the rear sloping wall may pivot. Additionally, a flat top wall is hinged to the sloping wall to cover the short span that is formed between the top edge of the sloping wall and the tail-gate. The top wall is locked by a hasp to the tail-gate. It is obvious from only a cursory review of this patent that a skilled artisan must apply it to the truck bed, requiring tools in the process, and the assembly is not easily removed, and in any event, modifications must be made to the truck bed.

U.S. Pat. No. 4,506,870 also related to a partition for a truck bed or box, but this device is constructed in such a way that it acts as a spoiler to reduce drag caused by the tail-gate. This construction constitutes a flat board hinged to the bottom of the truck bed a short distance away from the tail-gate so that it can be tilted forward and attached to the tail-gate or, in the alternative, the board may be pivoted so that it lies flat on the bed. As with the other patents described above, this device requires modification of the truck bed, the use of tools for installation, and is not easily removed. As with the other devices disclosed in the patents noted above, it is not intended that this construction be portable.

Accordingly, one of the objects of the invention is the provision of a pickup truck-bed divider device which is portable, being easily placed or removed.

Another object of the invention is the provision of a divider device for truck beds which may be applied and removed without use of tools of any kind.

Still another object of the invention is the provision of a pickup truck-bed divider device that is economical to fabricate and inexpensive to buy, thus promoting its wide use.

A still further object of the invention is the provision of a pickup truck-bed divider device that cooperates with the wheel wells that project into the truck bed to wedge the divider in position without the use of any other attachment means or, alternatively in the absence of wheel wells, wedges against the side walls to prevent shifting of the device.

Because of the simplicity of its design, the truck-bed divider device of my invention may be fabricated from steel, or wood, or plastic, the material used being dependent somewhat on the cost and the articles to be carried in the compartment formed by its installation.

The invention possesses other objects and features of advantage, some of which, with the foregoing, are described in the following description and the drawings. It is to be understood however that the invention is not limited to the embodiment illustrated and described since it may be embodied in various forms within the scope of the appended claims.

SUMMARY OF THE INVENTION

In terms of broad inclusion, the pickup truck-bed divider device of my invention comprises a generally flat support plate adapted to lie flat on the floor of the truck bed immediately in front of, or behind, the wheel well that projects upwardly into the truck bed or box. The lateral edges of the flat support plate are configured to coincide or conform to the curvature of the wheel well if one is present, and if not present, to wedge against the side wall at any point therealong. Mounted on the flat support plate is a baffle plate that extends vertically when the support plate is disposed on the truck bed. The baffle is preferably fixed rigidly to the support plate, and gussets are provided disposed between the flat support plate and the perpendicular baffle plate to support the baffle plate in an upright position. Means are provided in the baffle plate adjacent the top edge thereof to form a hand-hold by which the device may be carried easily in one hand.

DESCRIPTION OF THE PREFERRED EMBODIMENT

Figure 1:
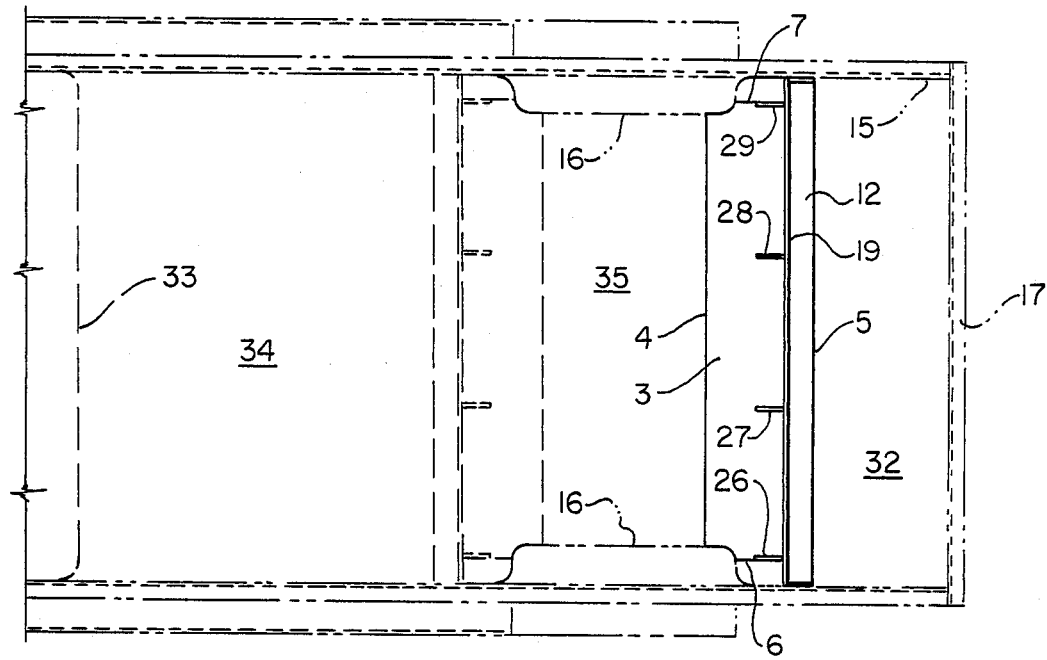
FIG. 1 is a plan view of the device shown in full lines with the truck bed shown in broken lines.
Figure 2:
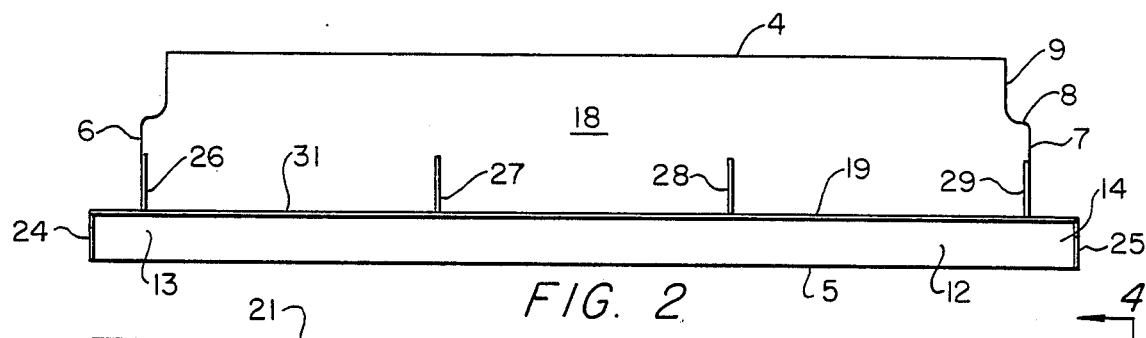
FIG. 2 is a plan view of the divider device in a somewhat larger scale and shown apart from the truck bed.
Figure 3:
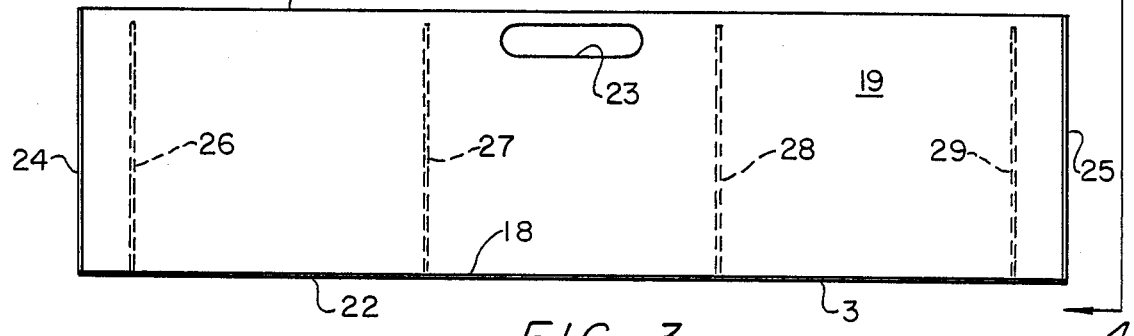
FIG. 3 is a rear elevational view of the divider.
Figure 4:
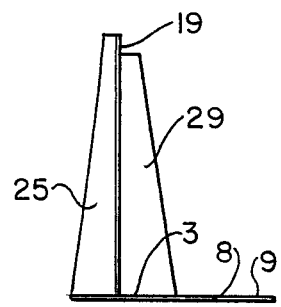
FIG. 4 is an end elevational view of the divider.

In terms of greater detail, the truck bed divider device of the invention comprises a flat support plate 3 conveniently fabricated from metal, plastic or wood, and having a forward edge 4, a rear edge 5, and end edges 6 and 7. As illustrated in FIGS. 1 and 2, the end edges 6 and 7 are cut away to provide a shoulder 8 and an end edge extension 9 at each end for purposes which will hereinafter be explained. Additionally, the rear edge portion 12 of the flat support plate 3 is extended in portions 13 and 14 that extend beyond the end edges 6 and 7. As illustrated in FIG. 1, the extensions 13 and 14 extend substantially out to the lateral limits imposed by the inside surface 15 of the truck bed or box. Similarly, the shoulder 8 and the end edge extensions 9 at each end of the support plate 3 closely abut and follow the contour of the wheel well 16, the wheel well thus functioning as an abutment to limit forward movement of the divider device when the divider is placed between the tail-gate 17 and the wheel wells.

Mounted on the top surface 18 of the support plate 3 is a transversely extending baffle plate 19 having an upper edge 21 and a lower edge 22 that is attached in any suitable manner to the top surface 18 of the support plate 3. As illustrated in FIG. 2, the baffle plate 19 is provided with a hand aperture 23 that facilitates carrying the divider device. Additionally, for purposes of rigidity, the baffle plate 19 is provided at opposite ends with rearwardly extending flanges 24 and 25 that end coincident with the rear edge 5 of the flat support plate 3 as shown. To lend further rigidity to the interconnection of the baffle plate 12 and the flat support plate 3, gusset plates 26, 27, 28 and 29 are attached between the support plate 3 and the baffle plate 19, being positioned on the front surface 31 thereof, this being the surface of the baffle plate next adjacent the shoulders 8 and the end extensions 9. Preferably, when the divider device is fabricated from metal, the gusset plates 26-29 are suitabley secured between the baffle and the support plate as by welding. Alternatively, when the divider device is fabricated from an appropriate plastic, the gussets may be molded directly to the structure, or may be secured therebetween with an appropriate adhesive. In like manner, when the divider device is fabricated from wood, the gusset plates 26-29 may similarly be secured by an appropriate adhesive. It will thus be seen that the gussets prevent the baffle plate 19 from tipping forwardly when articles of merchanidse, such as grocery bags laden with groceries are stacked in the space 32 between the divider device and the tail-gate 17. In like manner, the end flanges 24 and 25 on the baffle plate 19 provide rigidity for the baffle plate and cooperate with the lower flat support plate 3 to prevent the divider device from tipping backwardly due to the forces of acceleration of the truck in which it is mounted.

Referring to FIG. 1, it will there be seen that while I have illustrated the divider device mounted between the wheel wells 16 and the tail-gate 17 to create the greatly reduced space 32 within which articles to be carried may be stacked, the divider device may also be mounted as illustrated in broken lines on the front side of the wheel wells 16 and behind the cab 33. In this position of the divider device it will of course be obvious that again a reduced space 34 has been created behind the cab 33, thus facilitating the placement of bags of groceries or other articles of merchandise in the space 34 in the absence of a camper shell. It will of course be understood that one of the primary purposes of the divider device when placed as illustrated in FIG. 1 in full lines next adjacent the tail-gate is to facilitate the placement of bags of groceries in the space 32 by opening the rear door (not shown) of the camper shell and merely depositing the bags of groceries into the space 32. If the pickup truck is not equipped with a camper shell, it is probably more expedient that the divider device be placed in the alternate position in front of the wheel wells 16 and behind the cab 33 so that the space 34 is created, thus pemitting the grocery bags to be stacked in this alternate position. Obviously, two such divider devices may be used in the positions indicated to divide the truck bed into three separate and greatly reduced spaces 32, 34 and 35, the latter space being defined between the two divider devices and the wheel wells.

Having described the invention, what is believed to be novel and sought to be protected by letters patent of the United States is as follows:

I claim:

1. A portable divider device for dividing a pickup truck bed having a flat floor and spaced side walls into at least two smaller compartmetns without use of tools or modification of the truck bed and without attachment to the truck bed so that the divider device may be freely applied to compartmentalize the truck bed or removed to restore the truck bed to its non-compartmentalized condition, comprising:
    (a) an elongated support plate having first and second elongated edges intercepted by opposite end edges and adapted to extend transversely across and lie flat on said flat floor of said truck bed but unattached thereto with said end edges next adjacent said truck bed side walls; and
    (b) a baffle plate having a height less than its length mounted perpendicularly on said elongated support plate and extending longitudinally therealong whereby when said support plate is placed flat on said flat floor of the truck bed and extending thereacross said baffle plate extends vertically to a height less than the depth of said truck bed and transversely across the truck bed but unattached thereto to divide the interior of the truck bed into at least two smaller compartments.

2. The combination according to claim 1, in which gussets are provided mounted between the support plate and said baffle plate to rigidify the union therebetween.

3. The combination according to claim 1, in which said baffle plate is mounted on said support plate between said first and second elongated edges whereby portions of said support plate project on opposite sides of the baffle plate.

4. A portable divider device for dividing a pickup truck bed having a flat floor and spaced side walls into at least two smaller compartments without use of tools or modification of the truck bed, comprising:
    (a) an elongated support plate having first and second elongated edges intercepted by opposite end edges and adapted to extend transversely across and lie flat on said flat floor of said truck bed with said end edges next adjacent said truck bed side walls, said end edges being notched to conform to the configuration of wheel wells projecting into said truck bed next adjacent said side walls; and
    (b) a baffle plate mounted perpendicularly on said elongated support plate and extending longitudinally therealong whereby when said support plate is placed flat on said flat floor of the truck bed and extending thereacross said baffle plate extends vertically and transversely across the truck bed to divide the truck bed into at least two smaller compartments.

* * * * *